P. D. SHAW.
CIRCULAR SAW MILL.

No. 44,897.

Patented Nov. 1, 1864.

Witnesses.

Inventor.

UNITED STATES PATENT OFFICE.

P. D. SHAW, OF CARSON CITY, NEVADA TERRITORY.

IMPROVEMENT IN SAW-MILLS.

Specification forming part of Letters Patent No. 44,897, dated November 1, 1864.

*To all whom it may concern:*

Be it known that I, P. D. SHAW, of Carson City, in the county of Ormsby and Territory of Nevada, have invented a new and useful Improvement in Circular Saw Mills; and I do hereby declare that the following is a full, clear, and exact description thereof, which will enable others skilled in the art to make and use the same, reference being had to the accompanying drawings, forming a part of this specification, in which—

Figure 1:
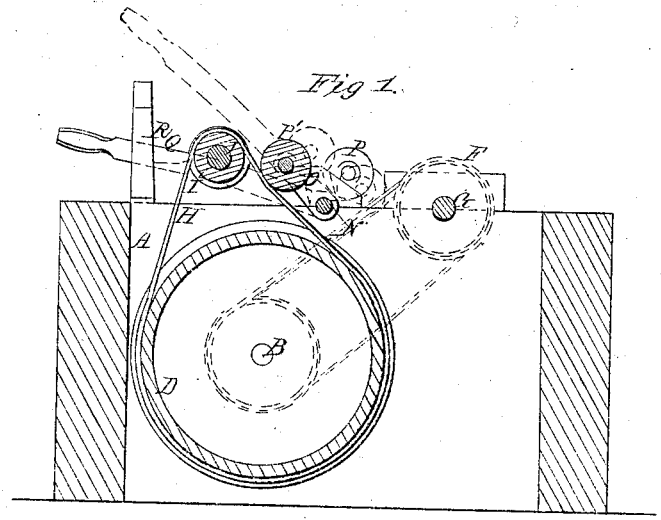
Figure 2:
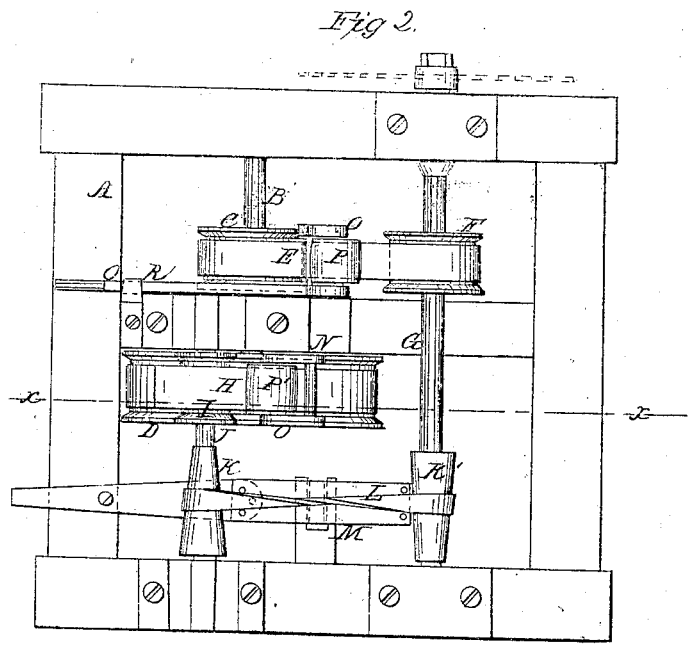

Figure 1 is a side sectional view of my invention taken in the line *x x*. Fig. 2; Fig. 2, a plan or top view of the same.

Similar letters of reference indicate like parts.

This invention relates to a new and useful means for driving circular saws and controlling the feed-movement of the carriage on which the stuff to be sawed is placed and dogged.

The invention consists in the employment or use of a tightener arranged with two belts, as hereinafter shown and described, whereby either belt may be rendered operative or inoperative, as desired, and the feed-driving belt made, when required, to operate as a brake for the feed mechanism of the carriage.

A represents the framing of the saw-mill, which may be constructed in any proper manner to support the working parts, and B is a shaft which has a pulley, C, upon it, and also a pulley, D, the latter being much larger in diameter than C, as shown in Fig. 2.

E is a belt which passes around the pulley C and a pulley, F, on the saw-shaft G, and H is a belt which passes around the pulley D and a pulley, I, on a shaft, J, which also has a cone-pulley, K, upon it, around which and a reverse-cone pulley, K', on the saw-shaft G, a cross-belt, L, passes, which is adjusted by a shipper M.

N is a shaft fitted or placed in the upper part of the framing A, and having a small frame, O, projecting from its ends at opposite sides, in which pulleys P P' are placed. A lever, Q, is attached to this shaft for the purpose of turning it, and the pulley P is over the belt E, and the pulley P' over the belt H, and said pulleys have such a relative position with their respective belts that when one pulley is pressed in contact with the belt underneath it the other will be raised from its belt. When the pulley P' is on the belt H, pressed thereon by the gravity of the lever Q, the carriage is driven in a working direction, or fed to the saw, through the medium of the belts H L and the usual gearing connected with the shaft B. By raising the lever Q so that the pulley P will press upon the belt E, the gigging-back movement is given the carriage, and this movement may be checked, to prevent the carriage being gigged back too far, by depressing the lever Q so that the pulley P' will press upon the belt H, in which case the gigging back motion is checked and entirely stopped, if desired, in consequence of the belt L being a cross one and the belt E a straight one. By having the lever Q held by a catch, R, so that neither of the pulleys P or P' will rest upon their respective belts, the carriage will not be moved in either direction.

Having thus described my invention, I claim as new and desire to secure by Letters Patent—

The belt-tightener formed or constructed with the two pulleys P P', arranged as shown, in connection with the two belts E H and cross belt L, all arranged with the saw-shaft G and shaft B, to operate substantially as and for the purpose set forth.

P. D. SHAW.

Witnesses:
S. BUCKINGHAM,
C. A. BRAGG.